United States Patent
D'Angelo et al.

(10) Patent No.: US 9,350,236 B2
(45) Date of Patent: May 24, 2016

(54) SWITCHING REGULATOR WITH REDUCED BODY DIODE CONDUCTION

(71) Applicant: ADVANCED ANALOGIC TECHNOLOGIES INCORPORATED, Santa Clara, CA (US)

(72) Inventors: Kevin Peter D'Angelo, Carmel, CA (US); Robert Stephen Wrathall, Scotts Valley, CA (US)

(73) Assignee: ADVANCED ANALOGIC TECHNOLOGIES INCORPORATED, Santa Clara, CA (US)

( * ) Notice: Subject to any disclaimer, the term of this patent is extended or adjusted under 35 U.S.C. 154(b) by 113 days.

(21) Appl. No.: 14/340,292

(22) Filed: Jul. 24, 2014

(65) Prior Publication Data

US 2014/0333272 A1 Nov. 13, 2014

Related U.S. Application Data

(63) Continuation of application No. 11/835,650, filed on Aug. 8, 2007, now Pat. No. 8,803,494.

(60) Provisional application No. 60/911,740, filed on Apr. 13, 2007.

(51) Int. Cl.
*H02M 3/156* (2006.01)
*H02M 1/08* (2006.01)
*H02M 3/158* (2006.01)

(52) U.S. Cl.
CPC ............. *H02M 3/156* (2013.01); *H02M 1/08* (2013.01); *H02M 3/1588* (2013.01); *Y02B 70/1466* (2013.01)

(58) Field of Classification Search
CPC ....................................................... H02M 3/156
See application file for complete search history.

(56) References Cited

U.S. PATENT DOCUMENTS

| 4,626,704 | A | * | 12/1986 | Takata | ................. | G11C 5/143 |
| | | | | | | 323/299 |
| 6,107,844 | A | | 8/2000 | Berg et al. | | |
| 7,817,459 | B2 | * | 10/2010 | Lin | .................... | G11C 7/1051 |
| | | | | | | 365/154 |
| 2006/0125566 | A1 | | 6/2006 | Lou et al. | | |
| 2006/0158127 | A1 | | 7/2006 | Xu | | |

* cited by examiner

*Primary Examiner* — Emily P Pham
(74) *Attorney, Agent, or Firm* — Lando & Anastasi, LLP

(57) ABSTRACT

A switching regulator that includes a high-side MOSFET, a low-side MOSFET, a high-side driver circuit, a low-side driver circuit, and a capacitive coupling circuit. An output of the high-side driver circuit is coupled to a gate of the high-side MOSFET to control the high-side MOSFET to be substantially depleted during a first operational phase and to be substantially enhanced during a second operational phase. An output of the low-side driver circuit is coupled to a gate of the low-side MOSFET to control the low-side MOSFET to be substantially enhanced during the first operational phase and to provide a regulated drain-to-source current during the second operational phase. The capacitive coupling circuit is coupled to an input of the high-side driver circuit and the gate of the low-side MOSFET and decreases the regulated drain-to-source current during a transition from the first operational phase to the second operational phase.

20 Claims, 4 Drawing Sheets

SWITCHING REGULATOR WITH REDUCED BODY DIODE CONDUCTION

CROSS REFERENCE TO RELATED APPLICATIONS

This application is a Continuation of U.S. patent application Ser. No. 11/835,650, titled "METHOD FOR REDUCING BODY DIODE CONDUCTION IN NMOS SYNCHRONOUS RECTIFIERS," filed Aug. 8, 2007, which is incorporated herein by reference in its entirety. U.S. patent application Ser. No. 11/835,650 claims priority under 35 U.S.C. §119(e) to U.S. Provisional Application Ser. No. 60/911,740 filed Apr. 13, 2007.

BACKGROUND OF THE INVENTION

Switching regulators are intended to be efficient machines for converting an input voltage to an output voltage. The two most common types of switching regulators are Boost (voltage increasing converters) and Buck (voltage decreasing regulators). Both Boost and Buck regulators are very important for battery powered applications such as cellphones. As shown in FIG. 1A, a traditional implementation for a Buck regulator includes a switch M1 connected between an input voltage ($V_{BATT}$ in this case) and a node $V_x$. A diode D is connected between the node $V_x$ and ground. An inductor L is connected between $V_x$ and the output node ($V_{OUT}$) of the regulator. A filtering capacitor connects $V_{OUT}$ to ground. The node $V_{OUT}$ is also connected to a load (not shown).

A control circuit turns switch M1 ON and OFF in a repeating pattern. This causes the Buck regulator to have two distinct operational phases. In the first phase, shown in FIG. 1B, the switch M1 is ON. During this phase, called the charging phase, the inductor is connected between the battery and the output node $V_{OUT}$. This causes current to flow from the battery to the load. In the process energy is stored in the inductor L in the form of a magnetic field.

In the second, or discharge phase the switch M1 is opened (see FIG. 1C). In this phase the diode and inductor are connected in series between ground and the load. In this phase, current supplied by the inductor's magnetic field flows to the output node $V_{OUT}$ and the load. As the inductor's magnetic field collapses and the voltage over the inductor falls, the diode prevents current flowing through the inductor from reversing direction and flowing from the load to ground.

In general, switching regulators work in environments where both the input and output voltage are dynamic voltages. Input voltages change as battery voltages decline over time or as other components draw more power. Output voltages change depending on load requirements. Switching regulators react to changes in input and output voltages by varying the amount of time that the switch M1 remains ON. This is done using two different methods. In the first method, the switching frequency is varied—as the load on the regulator increases (relative to its supply) the switching frequency is increased. This is known as pulse frequency modulation or PFM. In the second method a fixed switching frequency is used and the amount of time that the switch M1 is turned ON is varied. For larger loads, the switches stay ON longer. This is known as pulse width modulation of PWM. Of the two methods, PWM is often preferred because it produces noise at a known and therefore filterable fixed frequency. Filtering the noise created by a PFM regulator can be problematic—especially in portable applications.

The regulator architecture just illustrated suffers one fundamental flaw: the diode D has, by nature a forward voltage drop. Depending on the type of diode, this can be fairly small, but is still generally unacceptable for low voltage applications. For this reason, it is common to replace the diode D with a second switch M2. FIGS. 2A and 2B show Boost and Buck regulators of this type, respectively. The basic idea is that the switch M2 operates with no voltage drop (when switched ON) overcoming the disadvantages inherent in diode based designs.

In regulators of this type, the switch M1 is often referred to as the high-side switch and the switch M2 is referred to as the low-side switch. The switch M2 is also referred to as a "synchronous rectifier" because the two switches are driven synchronously—when one is ON, the other is OFF. In the real world, this is never quite the case. It takes time to turn the switches ON and OFF and control cannot be done with absolute precision. For this reason, the act of turning a switch OFF is always done slightly in advance of the act of turning the other switch ON. This technique, known as break-before-make or BBM avoids the situation where both switches are ON at the same time and power is connected to ground (a condition known as shoot through).

In many switching regulators, the high and low-side switches are fabricated as MOSFET devices that are integrated monolithically with the control circuit. During the time between switching OFF the low-side switch and the switching ON of the high-side switch, when the channels of both high and low side MOSFET devices are not conducting, the inductor current forward biases the body diode in the low side MOSFET switch. This is undesirable for the following reasons:

1) Minority carriers are injected into the substrate (on which the MOSFET devices are fabricated) which may upset other circuits controlling the power devices;

2) The forward biased body diode must be reversed before the high side switch can fully conduct; and 3) The larger voltage drop across the body diode compared to the voltage drop across the channel is less efficient.

SUMMARY OF THE INVENTION

An embodiment of the present invention includes a method for reducing body diode conduction in NMOS synchronous rectifiers. The method is intended to be used in all applications where synchronous rectifiers are used and is particularly applicable to synchronous DC/DC switching power converters. The invention is specifically intended to include physical implementations (apparatus) that correspond to the described method.

A typical Buck switching regulator that practices the current invention includes a high-side switch connected between an input voltage ($V_{BATT}$ in this case) and a node $L_x$. A low-side switch is connected between the node $L_x$ and ground. An inductor L is connected between $L_x$ and the output node ($V_{OUT}$) of the regulator. A filtering capacitor connects $V_{OUT}$ to ground. The node $V_{OUT}$ is also connected to power a load.

In gross terms, the high and low-side switches are switched out of phase-when one is ON, the other is OFF. This generalization ignores break-before-make periods where both switches are momentarily OFF to prevent shoot through. Also ignored in this generalization is the operation of the low-side switch which is never actually turned OFF. Instead, the low-side switch is either enhanced (i.e., ON) or is operated to provide a substantially constant drain-to-source current (i.e., operates as a current source).

Operation of the low-side switch in this manner gives the switching regulator two distinct operational phases. During the first operational phase, the high-side switch is OFF and the low-side switch is ON. During the second operational phase, the high-side switch is ON and the low-side switch acts as a current source.

Importantly, during transitions between the second and first operational phases, the low-side switch is controlled to momentarily decrease the regulated drain-to-source current. This prevents the high-side switch from conducting excess current as the high-side switch is turned OFF and the low-side switch is turned ON.

DETAILED DESCRIPTION OF THE PREFERRED EMBODIMENTS

An embodiment of the present invention includes a method for reducing body diode conduction in NMOS synchronous rectifiers. The method is intended to be used in all applications where synchronous rectifiers are used and is particularly applicable to synchronous DC/DC switching power converters. The invention being described is specifically intended to include physical implementations (apparatus) that correspond to the described method.

Figure 1A:
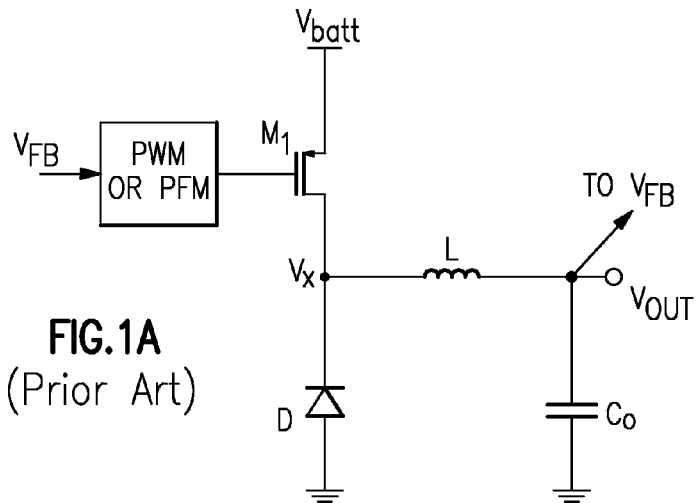
FIG. 1A is a block diagram of a prior art buck switching regulator.
Figure 1B:
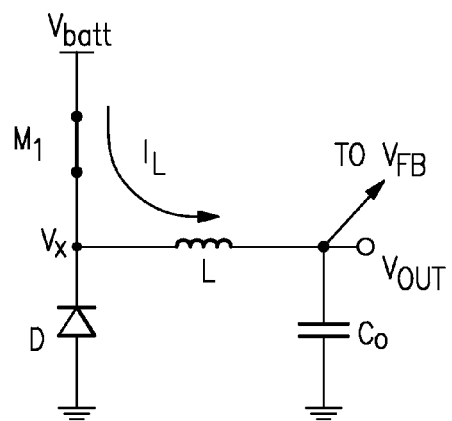
FIG. 1B is a block diagram showing the prior art buck switching regulator of FIG. 1 during the charge phase of operation.
Figure 1C:
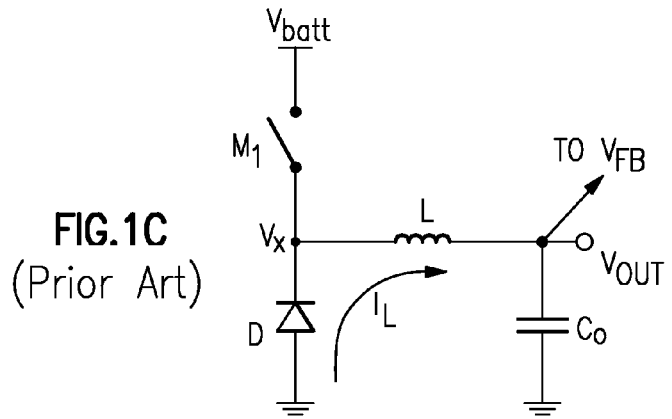
FIG. 1C is a block diagram showing the prior art buck switching regulator of FIG. 1 during the discharge phase of operation.
Figure 2A:
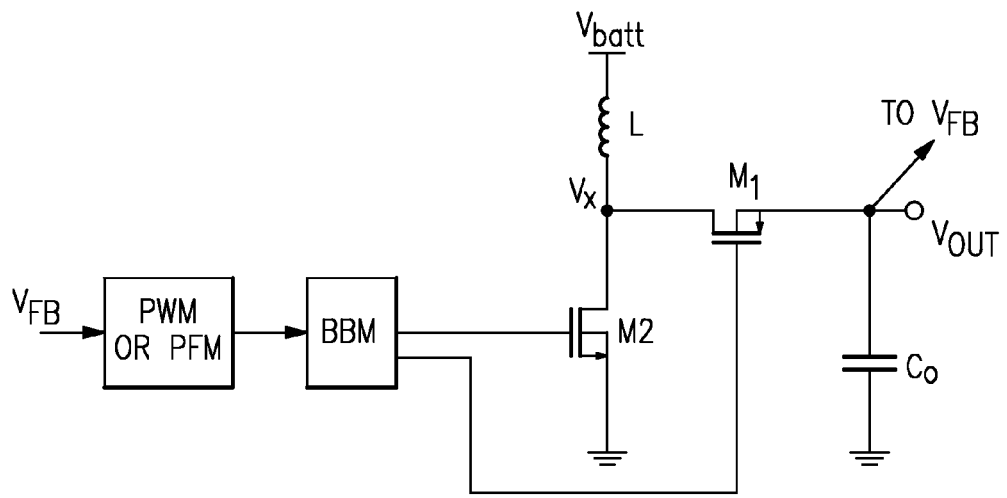
FIG. 2A is a block diagram of a prior art boost switching regulator that includes a low-side switch.
Figure 2B:
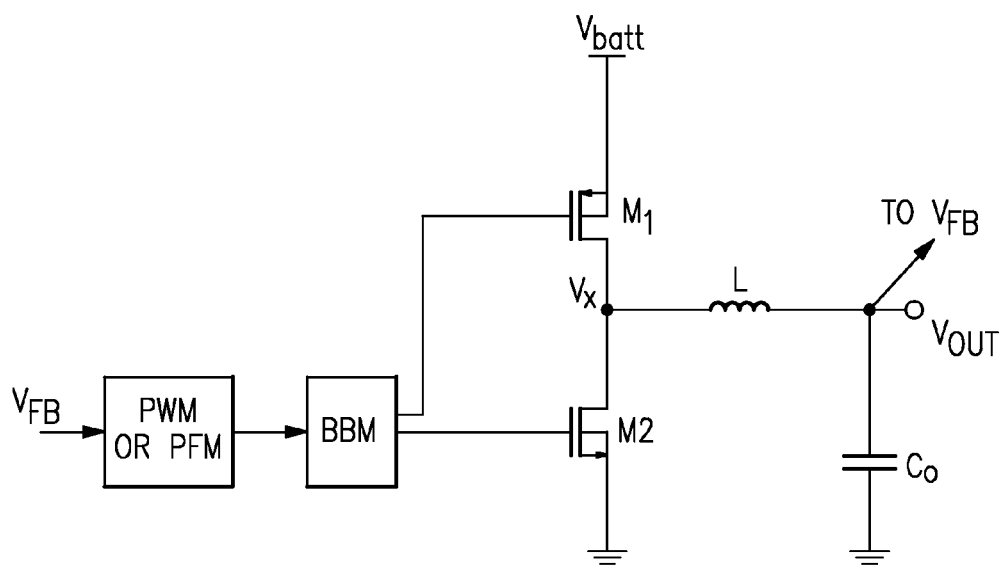
FIG. 2B is a block diagram of a prior art buck switching regulator that includes a low-side switch.
Figure 3:
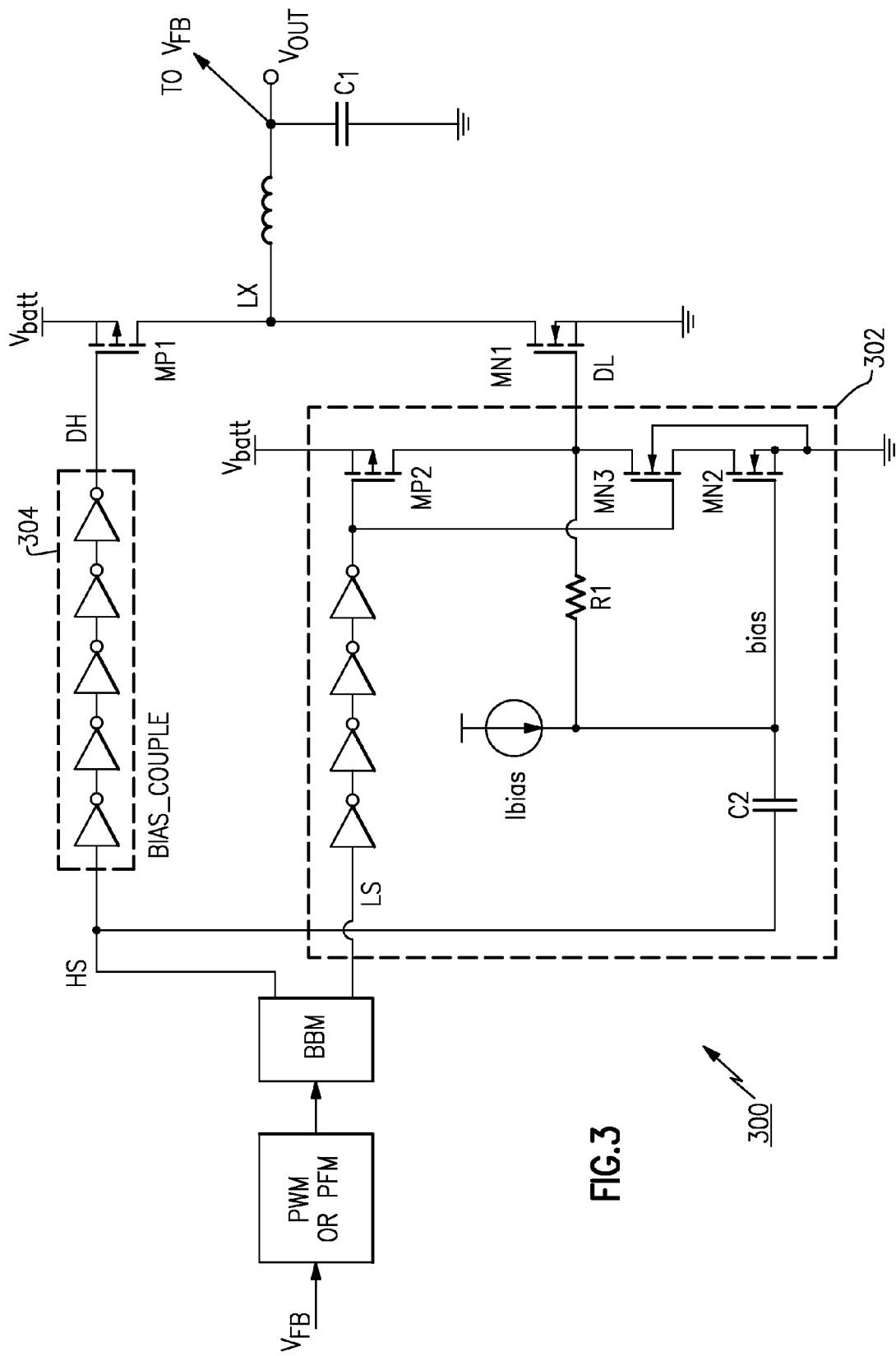
FIG. 3 is a block diagram of a buck switching regulator implemented to use the method for reducing body diode conduction provided by the present invention.

FIG. 3 shows a buck type switching regulator 300 implemented using the method for reducing body diode conduction. As shown in FIG. 3, buck regulator 300 includes a high-side PMOS device MP1 connected between an input voltage ($V_{BATT}$ in this case) and a node $L_x$. A low-side NMOS device MN1 is connected between the node $L_x$ and ground. An inductor connects the node $L_x$ to an output node $V_{OUT}$ and a capacitor C1 connects the output node $V_{OUT}$ to ground. A feedback voltage VFB is derived from the output node $V_{OUT}$. VFB is typically proportional to the voltage at output node $V_{OUT}$ and is typically derived using a resistor divider (not shown).

Low-side NMOS device MN1 is connected to be controlled by a low-side driver circuit 302. High-side PMOS device MP1 is similarly connected to be driven by a high-side driver circuit 304. The two driver circuits (302 and 304) are connected to be driven by a PWM/PFM controller in series with a break before make circuit. The PWM/PFM controller produces a pulse width modulation (PWM) or pulse frequency modulation (PFM) signal in response to the feedback voltage $V_{FB}$. The PWM/PFM controller may use any form or combination of PWM or PFM methods. PWM/PFM controller may also be implemented to use light load power saving strategies including sleep mode, pulse skipping or burst mode.

The BBM circuit modifies the signal produced by the PWM/PFM controller to ensure that there are no cases where low-side NMOS device MN1 and high-side PMOS are simultaneously ON. In general, it should be appreciated that PWM/PFM controller and BBM circuit are intended to be representative of a wide range of circuits that may be used to produce control signals for the switches in switching regulators.

High-side driver circuit 304 includes a series of inverters. Each inverter is sized to amplify the signal produced by the BBM circuit.

Low-side driver circuit 302 includes a similar series of inverters. The output of the final inverter drives the gate of a PMOS device MP2 and the gate of an NMOS device MN3. MP2 and MN3 are cascode connected with the drain of MP2 connected to the drain of MN3 at a node DL. The node DL is connected to drive the low-side NMOS device MN1.

The source of MN3 is connected to the drain of another NMOS device MN2. The source of MN2 is connected to ground. The NMOS device MN2 is diode-connected through a transistor R1. A current source drives the gate of MN2 and supplies current through the transistor R1 and MN2 to ground. An AC circuit couples the gate of MN2 to the input of the high-side driver circuit 304.

Figure 4A:
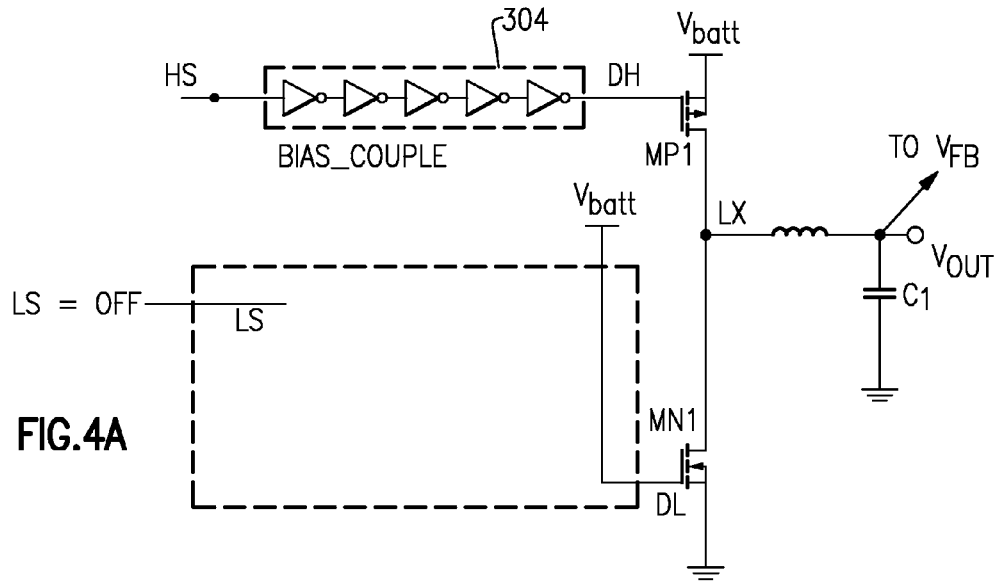
FIG. 4A is a block diagram of the buck switching regulator of FIG. 3 during rectifying mode operation.

The low-side driver circuit 302 operates in two different modes: a first mode in which the low-side NMOS device MN1 is ON and a second mode in which the low-side NMOS device MN1 acts as a current source. The first mode occurs when the input signal to the low-side driver circuit 302 is driven low. This causes the PMOS device MP2 to be fully enhanced and the NMOS device MN3 to be depleted. As shown in FIG. 4A, the resulting circuit couples the gate of low-side NMOS device MN1 to the supply voltage. This causes the low-side NMOS device MN1 to be fully enhanced allowing current to flow from ground through the inductor to the output capacitor and load.

Figure 4B:
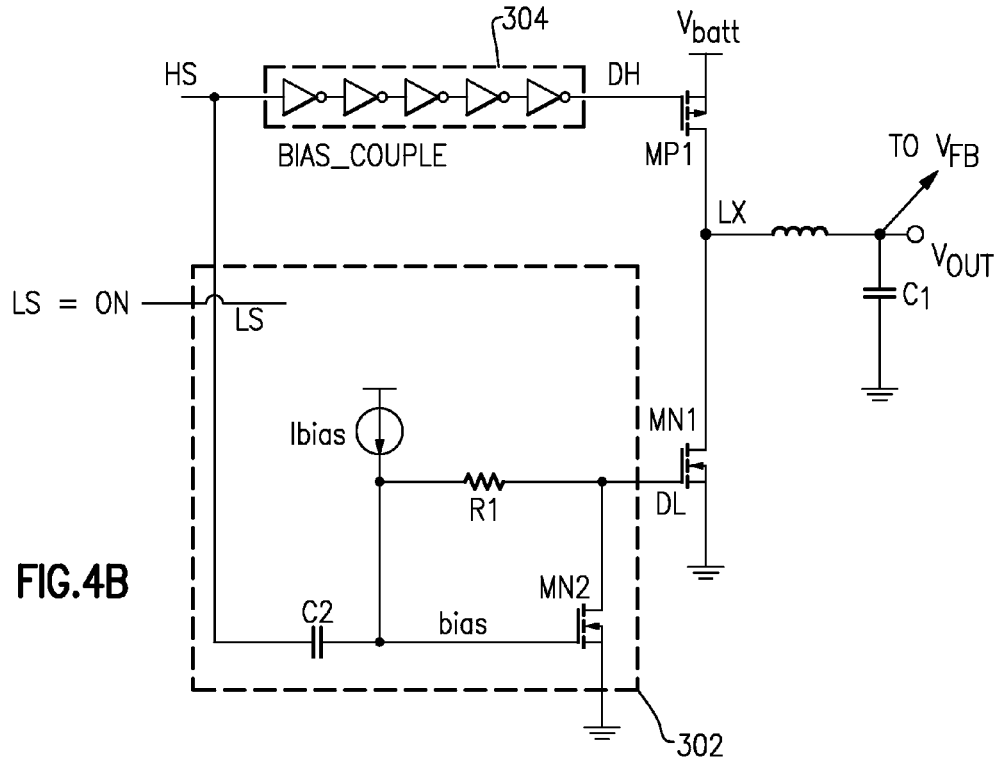
FIG. 4B is a block diagram of the buck switching regulator of FIG. 3 during non-rectifying mode operation.

The second mode occurs when the input signal to the low-side driver circuit 302 is driven high. This causes the PMOS device MP2 to be depleted and the NMOS device MN3 to be enhanced. As shown in FIG. 4B, the resulting circuit causes the NMOS device MN2 to be diode connected through R1. The gate bias voltage DL for MN1 is determined by the current Ibias, into the diode connected MN2. In this configuration, the current source Ibias and the NMOS device MN2 are configured to act as a current mirror. The current mirror control voltage is presented at the gate of MN1 which makes MN1 a current source. The value of Ibias may be chosen to set the current in MN1. To reduce body diode conduction, Ibias may be chosen so that the current in MN1 is on the order of micro amps (e.g., between 5 and 50µ amps).

The AC circuit that includes capacitor C2 is required to prevent MN1 from conducting too much during conduction transition between the power devices MN1 and MP1. As MP1 begins to conduct, LX rapidly transitions from a low to a high voltage. This transition generally couples the gate of MN1 high which can result in shoot through current directly from MP1 through MN1 to ground. To prevent this, a low impedance path is generally provided from the gate of MN1 to ground in order to keep MN1 OFF. However, in this invention, it is desirable to keep MN1 conducting as a current source. With the DL voltage near the threshold of MN1 in the DC operating point, this is a problem since a small amount of voltage coupling into DL can cause DL to exceed the threshold and induce conduction. To prevent this, C2 is used to couple the bias voltage high and the DL voltage low during the transition of MP1 conducting. After MP1 is conducting, the bias voltage returns to the level where MN1 can conduct a small amount of current. R1 serves to de-couple the gate of MN2 from DL when C2 is coupling the gate of MN2 to a high voltage level. When the voltage "bias-couple" from the high side drive has finished transitioning, and the current in C2 has diminished, R1 rapidly charges bias back to the proper operating point. It is desirable to couple the gate of MN2 high before the power device MP1 begins to conduct, so the coupling voltage is ideally taken from a signal that transitions prior to the gate of MP1 that is in phase with the LX voltage.

In discontinuous conduction, since the high side is not transitioned, a soft transition is achieved from a high voltage on DL to the reference bias voltage level on DL. This allows the current in MN1 to decay through the channel of MN1 rather than through the body diode, and diminishes the L, C, R tank oscillation seen on the LX node.

In continuous conduction, a soft transition from an ON state to a state where MN1 acts as a current source means that the channel of MN1 conducts during the break before make period instead of the body diode.

What is claimed is:

1. A switching regulator comprising:
   a high-side MOSFET having a gate, a source, and a drain;
   a low-side MOSFET having a gate, a source, and a drain;
   a high-side driver circuit having an input and an output, the output of the high-side driver circuit being coupled to the gate of the high-side MOSFET to control the high-side MOSFET to be substantially depleted during a first operational phase and to be substantially enhanced during a second operational phase;
   a low-side driver circuit having an input and an output, the output of the low-side driver circuit being coupled to the gate of the low-side MOSFET to control the low-side MOSFET to be substantially enhanced during the first operational phase and to provide a regulated drain-to-source current during the second operational phase; and
   a capacitive coupling circuit, coupled to the input of the high-side driver circuit and the gate of the low-side MOSFET that decreases the regulated drain-to-source current during a transition from the first operational phase to the second operational phase.

2. The switching regulator of claim 1 wherein the switching regulator is configured as one of a boost regulator and a buck regulator.

3. The switching regulator of claim 1 wherein the high-side MOSFET and the low-side MOSFET are connected in series between a supply voltage and ground.

4. The switching regulator of claim 3 further comprising an inductor coupled between a common node connecting the high-side MOSFET in series with the low-side MOSFET and an output of the switching regulator.

5. The switching regulator of claim 3 further comprising first and second cascode-connected MOSFETs coupled between the supply voltage and ground, a source of the first cascode-connected MOSFET being coupled to the supply voltage, a drain of the first cascode-connected MOSFET being connected to a drain of the second cascode-connected MOSFET and the gate of the low-side MOSFET, a source of the second cascode-connected MOSFET being coupled to ground, and a gate of the first and second cascode-connected MOSFETs being connected to the output of the low-side driver circuit.

6. The switching regulator of claim 5 further comprising a diode-connected MOSFET connected between the source of the second cascode-connected MOSFET and ground.

7. The switching regulator of claim 6 wherein the diode-connected MOSFET is an N-channel diode-connected MOSFET having a source connected to the source of the second cascode-connected MOSFET and a drain connected to ground.

8. The switching regulator of claim 7 wherein the capacitive coupling circuit includes a capacitor and a resistor, the capacitor being connected between the input of the high-side driver circuit and a gate of the N-channel diode-connected MOSFET, and the resistor being connected between the gate of the low-side MOSFET and the gate of the N-channel diode-connected MOSFET.

9. The switching regulator of claim 8 further comprising a current source connected to the capacitor, the resistor, and the gate of the N-channel diode-connected MOSFET.

10. The switching regulator of claim 1 further comprising a filter capacitor connected between an output of the switching regulator and ground.

11. The switching regulator of claim 10 further comprising:
    a pulse width modulation circuit having an input and an output, the input of the pulse width modulation circuit being coupled to the output of the switching regulator; and
    a break-before-make buffer circuit having an input coupled to the output of the pulse width modulation circuit and an output coupled to the input of the high-side driver circuit and the input of the low-side driver circuit.

12. The switching regulator of claim 10 further comprising:
    a pulse frequency modulation circuit having an input and an output, the input of the pulse frequency modulation circuit being coupled to the output of the switching regulator; and
    a break-before-make buffer circuit having an input coupled to the output of the pulse frequency modulation circuit and an output coupled to the input of the high-side driver circuit and the input of the low-side driver circuit.

13. A method of operating a switching regulator that includes a high-side MOSFET and a low-side MOSFET, the method comprising:
    controlling the high-side MOSFET to be substantially depleted during a first operational phase and to be substantially enhanced during a second operational phase;
    controlling the low-side MOSFET to be substantially enhanced during the first operational phase and to provide a regulated drain-to-source current during the second operational phase; and
    during a transition from the first operational phase to the second operational phase, capacitively coupling a voltage to a gate of the low-side MOSFET to momentarily reduce the regulated drain-to-source current.

14. The method of claim 13 wherein controlling the low-side MOSFET to be substantially enhanced during the first operational phase includes coupling the gate of the low-side MOSFET to a supply voltage through a first cascode-connected MOSFET.

15. The method of claim 14 wherein controlling the low-side MOSFET to provide the regulated drain-to-source current during the second operational phase includes coupling the gate of the low-side MOSFET to a current mirror through a second cascode-connected MOSFET that is cascode connected to the first cascode-connected MOSFET.

16. The method of claim 15 further comprising generating a gate voltage in the current mirror and providing the gate voltage to the gate of the low-side MOSFET during the second operational phase.

17. The method of claim 13 further comprising controlling an on time during which the high-side MOSFET and the low-side MOSFET are substantially enhanced with one of a pulse width modulation signal and a pulse frequency modulation signal.

18. The method of claim 17 further comprising ensuring that the high-side MOSFET and the low-side MOSFET are not simultaneously enhanced.

19. The method of claim 17 wherein the high-side MOSFET is connected in series with the low-side MOSFET between a supply voltage and ground at a common node and the method further comprises passing a voltage at the common node through an inductor to generate an output voltage.

20. The method of claim 19 further comprising using the output voltage to control the one of the pulse width modulation signal and the pulse frequency modulation signal.

* * * * *